Inventor
Hans O. Schjolin
By Willits, Helwig & Baillio
Attorneys

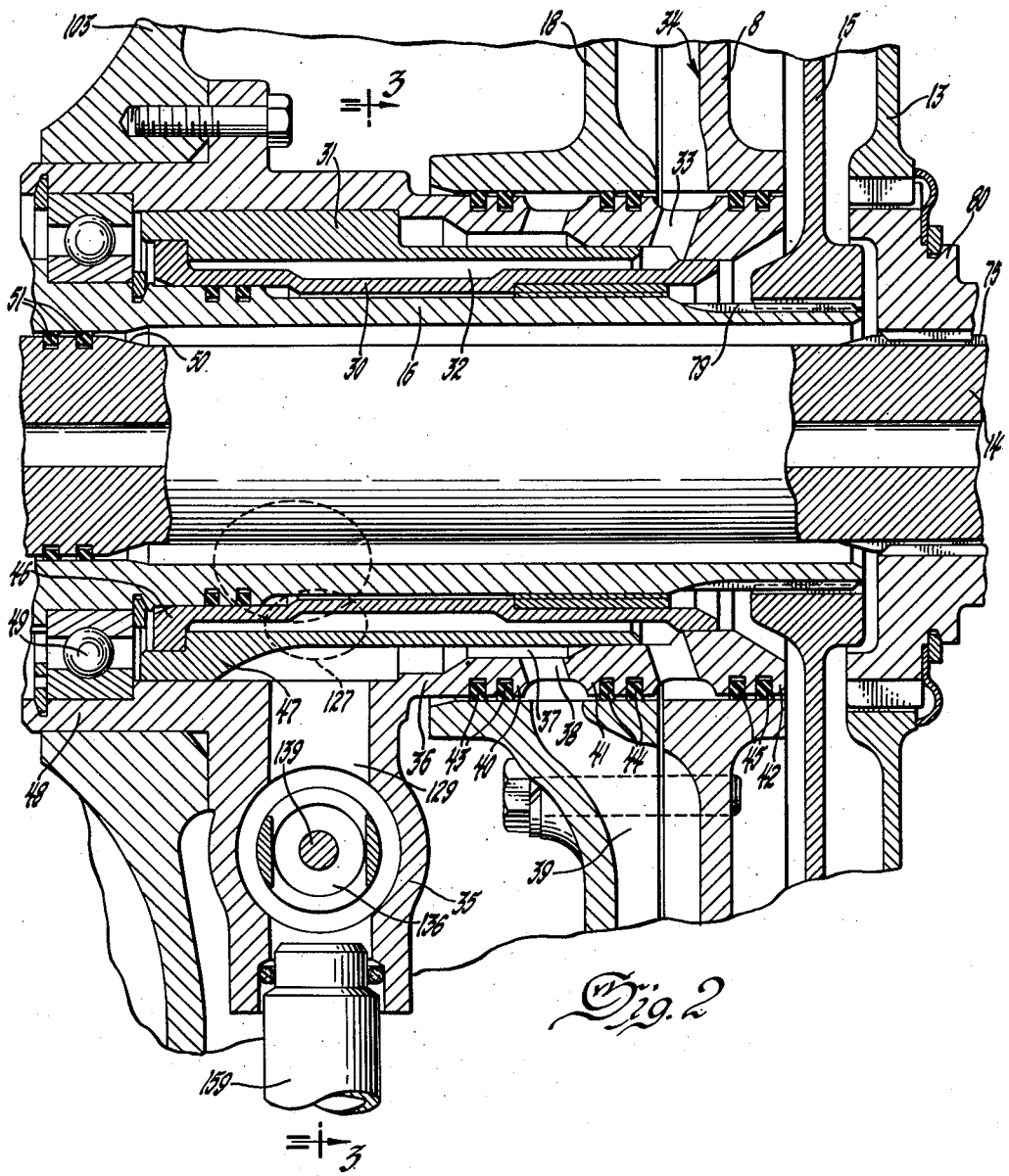

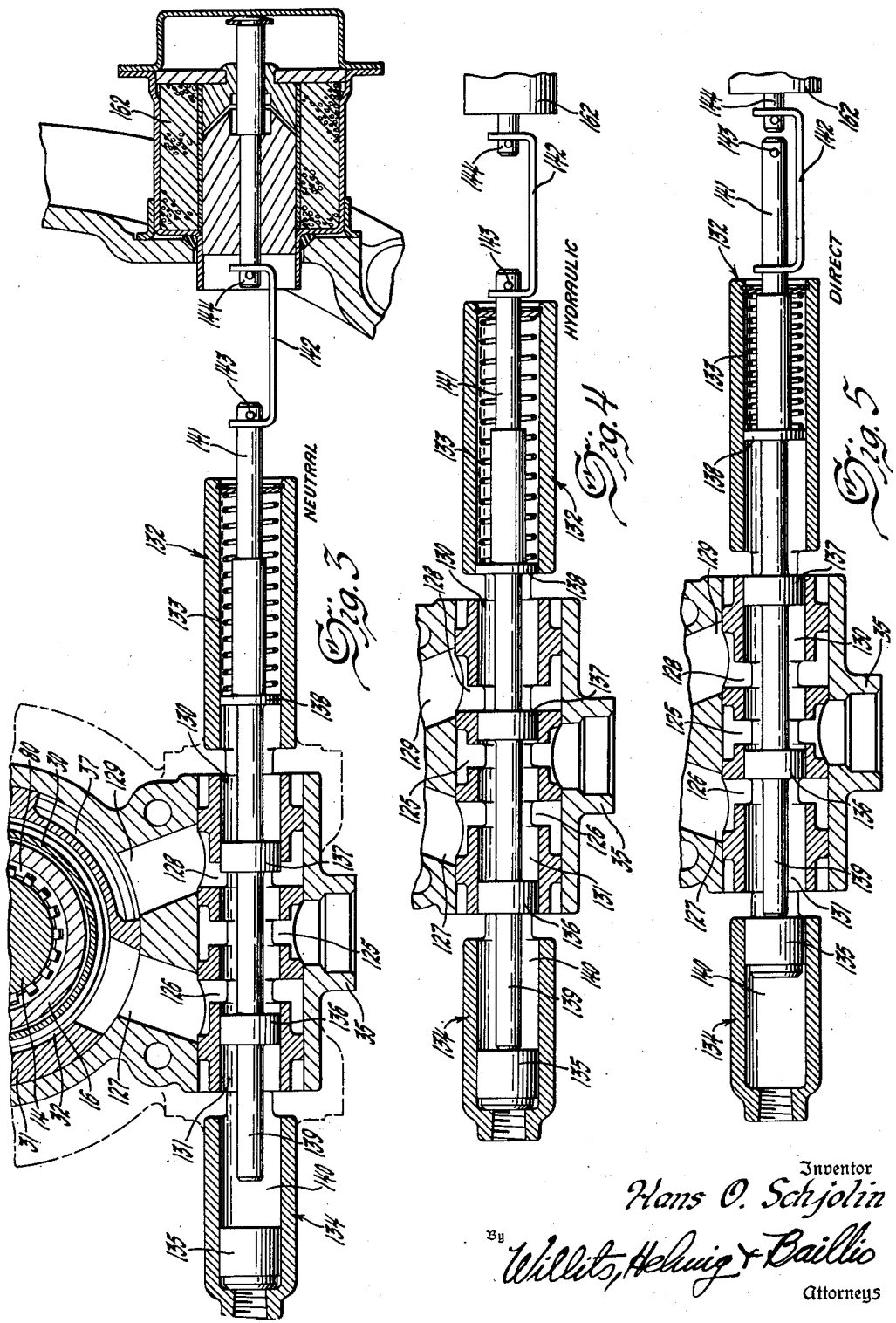

Sept. 25, 1956

H. O. SCHJOLIN 2,764,269

HYDRAULICALLY OPERATED DOUBLE ACTING
CLUTCH AND CONTROLS THEREFOR

Filed March 8, 1951

Inventor
Hans O. Schjolin

By Willits, Helmig & Baillio
Attorneys

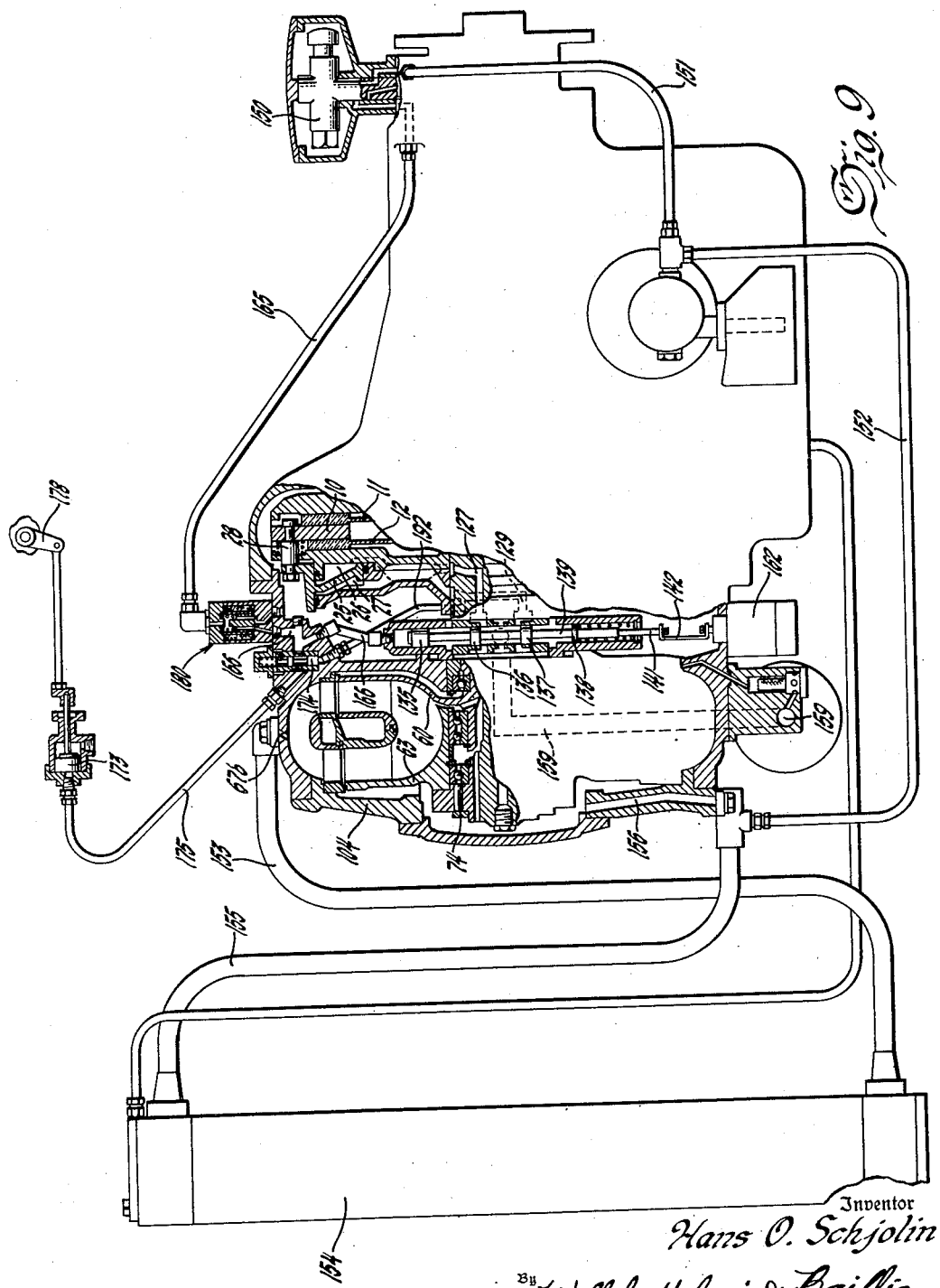

United States Patent Office 2,764,269
Patented Sept. 25, 1956

2,764,269

HYDRAULICALLY OPERATED DOUBLE ACTING CLUTCH AND CONTROLS THEREFOR

Hans O. Schjolin, Birmingham, Mich., assignor to General Motors Corporation, Detroit, Mich., a corporation of Delaware Application March 8, 1951, Serial No. 214,538

20 Claims. (Cl. 192—.098)

The present invention relates to transmission drive mechanism for vehicles and the control system therefor, in which a fluid torque converter provides infinitely variable speed ratio changes with torque multiplication, and incorporating a clutch mechanism for providing direct drive through the transmission without torque multiplication.

The control system for the transmission includes structural features departing from certain teachings in this art, as set forth in further detail below.

An object of this invention is to provide a transmission structure including a clutch adapted to be engaged for torque multiplication drive through a torque converter and a second clutch adapted to be engaged for direct drive through the transmission without torque multiplication.

Another object of this invention is to provide in a transmission of the type described a pair of spaced clutch plates adapted to be selectively actuated for torque multiplication drive or direct drive through the transmission and including a pressure plate axially movable to alternately engage the plates.

A further object of this invention is to provide in a transmission of the type described including a pair of spaced clutch plates and having a pressure plate extending therebetween, piston means for axially moving the pressure plate to alternately engage the plates for torque multiplication drive or direct drive through the transmission, in which the clutch control piston is arranged to be subjected to fluid pressure acting upon opposite sides of the piston and arranged to provide neutral or no-drive operation of the transmission when fluid pressure is admitted simultaneously to opposite sides of the clutch control piston.

A further object of this invention is to provide a control system for a transmission of the type described including a shift valve normally biased for initially providing torque multiplication drive through the transmission.

An additional object of this invention is to provide a control system for a transmission of the class described including governor means automatically operative to shift the transmission to direct drive when a predetermined vehicle speed is attained.

Another object of this invention is to provide a control system for a transmission of the class described including driver-operable control means for shifting the transmission from direct drive to torque multiplication drive irrespective of vehicle speed.

Yet another object of this invention is to provide in a control system for a transmission of the class described, means automatically operative immediately before shift from torque multiplication drive to direct drive, to momentarily close the vehicle engine throttle to minimize torque transfer at the moment of shift.

An additional object of this invention is to provide means effective upon completion of shift from reduction drive to direct drive to counteract the throttle closing means to permit the engine throttle to be opened.

A further object of this invention is to provide a piston means for actuating the transmission clutches constructed and arranged to be free of the centrifugal force effect normally present in clutch control arrangements of this type.

These and other objects of this invention will be apparent from the following specification and claims, taken in conjunction with the accompanying drawings, in which:

Figure 2 is an enlarged sectional view of a portion of Figure 1, illustrating the sleeve arrangement for admitting control pressure to the clutch control chambers.

Figure 3 is a sectional view taken along the line 3—3 of Figure 2, illustrating the control valve as positioned for neutral.

Figure 4 is a view similar to Figure 3, illustrating the control valve as positioned for hydraulic drive through the torque converter.

Figure 5 is a view similar to Figure 3, illustrating the control valve as positioned for direct drive.

Figure 9 is a partially sectional view illustrating the general arrangement of the control piping and valving.

Figure 1:
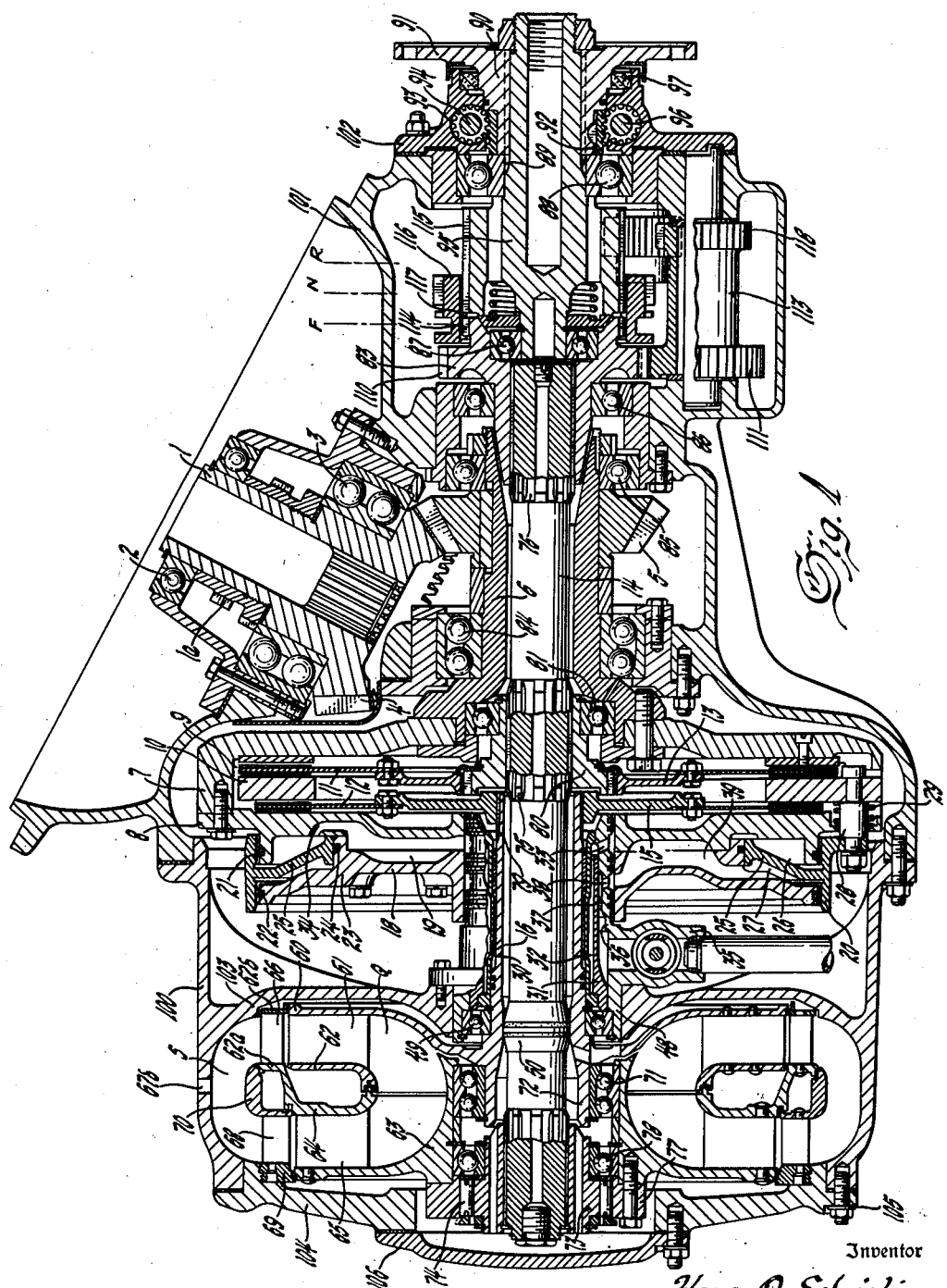
Figure 1 is a vertical section of a transmission constructed in accordance with the principles of this invention.

The transmission of Figure 1 includes a converter housing section 100, an intermediate housing section 101 and a rear housing section 102. An engine driven shaft 1 is rotatably supported in housing section 101 driving bevel gear 5 fixed to a hollow power input shaft 6, the latter shaft being fixed to clutch drum or flywheel 7. A radially extending disc 8 is bolted to the flywheel and cooperates therewith in forming a clutch chamber 9, in which is housed a pressure plate 10, and a pair of clutch plates 11 and 12 at opposite sides of pressure plate 10, clutch plate 11 being bolted to hub 13 splined to power delivery or load shaft 14 and clutch plate 12 being carried by hub 15 splined to a hollow intermediate 16, the latter shaft being secured to the impeller shell 60 of the torque converter. A housing member 18 is bolted to web or disc 8, the two members forming a space for receiving a piston therebetween. An annular drum or cylinder 20 extends circumferentially around members 8 and 18, forming a chamber 19. A pair of ring seals 21 and 22 carried by the members 8 and 18 and slidably engaged by the drum 20, prevent leakage of fluid pressure from the chamber 19. The wall 18 is provided with a shoulder or annular base portion 23 extending into the chamber 19 and carries a seal ring 24. A piston 25 formed on drum 20 engages seal 24 and base portion 23 and divides the chamber 19 into a pair of chambers 26 and 27 sealed from each other forming a pair of expansible chamber motors. Piston 25 and drum 20 are adapted to be moved axially in either direction under the influence of pressure fluid in the respective chambers 27 and 26 to engage either clutch 11 or 12 with the flywheel and thus place the transmission in either direct drive or reduction drive through the torque converter.

The anchor bolt 28 between the pressure plate 10 and piston 25, projects through and locates a spring 29 between the cover plate 8 and pressure plate 10 for normally centering the pressure plate in an intermediate position out of contact with both clutch plates 11 and 12 when pressure fluid is admitted to both chambers 26 and 27 on opposite sides of piston 25. A pressure fluid control system, hereafter more fully explained, selectively directs pressure fluid chamber 27 for direct drive, to chamber 26 for reduction drive through the torque converter, or to both chambers 26 and 27 for neutral. A hollow sleeve 30 surrounds the converter power input or intermediate shaft 16 and a second sleeve 31 concentrically spaced from sleeve 30 extends parallel to sleeve 30, the two sleeves forming a passage 32 therebetween whereby pressure fluid may be admitted from a control valve (see Figure 4) to chamber 26. Pressure fluid from the control valve is transferred through passage 32, port 33, and passage 34 to chamber 26 for reduction drive through the torque converter. A housing 35 supports the control valve and is provided with axial sleeve extension 36 concentrically spaced from sleeve 31, the extension and sleeve forming a passage 37 therebetween. A port 38 in extension 36 admits pressure fluid from passage 37 to passage 39 leading to chamber 27 for direct drive. Sleeve 36 carries three annular lands 40, 41 and 42, land 40 supporting the hub of cover plate 18, land 41 supporting the hub of cover plate 18 and one end of sleeve 31, and land 42 supporting one end of sleeve 30 and the hub of cover plate 8. The lands carry ring seals 43, 44 and 45, respectively. A boss 46 formed on the leftward end (see Figure 2) of sleeve 30 supports boss 47 of sleeve 31, the latter boss in turn acting to support an axial extension 48 of housing 35. The valve housing 35 is secured as by means of suitable bolts to radial web 103 of housing 100, there being a bearing 49 between turbine power input shaft 16 and valve housing extension 48. An annular enlargement 50 on the driven shaft 14 carries a pair of seal rings 51 as shown in Figure 2.

The torque converter impeller is composed of impeller shell 60 carrying impeller blades 61 with a core section 62 supporting the inner edges of the blades 61. An output turbine 63 with core ring section 64 supports the group of second stage turbine blades 65, and the extension 62a with ring 62b supports the first stage turbine blades 66.

The external bladeless channel S is connected externally at passage 67b for circulation of working space fluid to an oil cooler 154 as shown in Figure 9 and to the reservoir and pump system. Passage 67b is located in the high velocity outflow zone to facilitate such circulation.

Reaction blades 68 are supported in casing web or end wall 104 by a ring 69 and are fastened to scarf 70 which forms the inner circumferential face of space S. The inner bladeless space Q is approximately evenly divided between the working fluid inflow and outflow zones.

The converter arrangement is especially adapted for disassembly and repair. The external housing portion 100 is faced for flange jointing, the end wall 104 being bolted to the end face of the housing 100 at 105. A removable cover plate 106 is bolted over a central opening in the end wall 104.

The partition web 103 of housing 100 extends inward and is faced for matching the axial flange 48 of control valve housing 35. A bearing 49 supports the impeller input shaft 16, and a bearing 71 carried by the terminal 72 of the impeller input shaft supports the hub of the turbine output member 63.

The central or driven shaft 14 is splined as shown at the left of Figure 1 to the hub 73 of one-way clutch rollers 74, and extends to the right where two splined sections 75 and 76 are shown in axially spaced apart relation.

The driven turbine rotor 63 is bolted at the left to the outer race ring 77 of the one-way clutch, and is supported upon a bearing 78 on the hub 73 as well as the aforementioned bearing 71. The clutch rollers 74 are positioned between the annular raceways 73 and 77. The oneway clutch 73—74—77 locks up when the torque converter output rotor is driving the shaft 14. When, however, direct drive is obtained by engaging clutch plate 11, the one-way clutch permits shaft 14 to rotate freely in relation to the torque converter. Both the torque converter impeller 60 and turbine rotor 63 may be at a stand-still, the one-way clutch automatically disengaging whenever the shaft 14 overruns the rotor.

Hollow shaft 16 terminates at the right in a spline 79 to fit hub 15 of clutch plate 12. The splined portion 75 on the driven shaft 14 engages splines on the hub 80 and the hub 80 is splined to clutch plate 11. Bearing 81 supports the hub 80 in the left end of shaft 6 to which is bolted the clutch drum 9 and on which the input bevel gear 4 is fixed.

The splined end 76 of the driven shaft has drive engagement with a hub extension of a gear 83 which is the input member for the forward-reverse gear unit connecting shaft 14 to the transmission power output shaft 95. A bearing 84 rotatably supports one end of the power input shaft 6 in casing 101 and a bearing 85 supports the opposite end of shaft 6 in the casing 101. A bearing 86 supports one end of the gear 83 in casing 101, and a bearing 87 internally of the gear 83 pilots an end of the output shaft 95.

The gear 83 has external teeth 110 meshing with teeth 111 on the countershaft 113. The gear 83 also has jaw clutch teeth 114 aligned with splines 115 of shaft 95, on which slider 116 is mounted, with its teeth 117 arranged to engage with jaw teeth 114 for forward drive, as shown. External teeth on the slider 116 are provided to engage a reverse gear in constant mesh with a gear 118 of countershaft 113, for transmitting reverse drive from shaft 14 to shaft 95, when the slider 116 is shifted to the right in Figure 1. A bearing 88 supports output shaft 95. The output shaft is splined at 89 to drive the hub 90 of power output flange 91 and the hub 90 is keyed to a speedometer and governor drive gear 92 meshing with gear 93 of a governor drive shaft 94 and with the gear 92 of a speedometer shaft 96.

The forward and reverse gear settings are controlled by the axial positions of slider 116 operated manually by conventional levers not shown. The notations "F," "N" and "R" at the right of Figure 1 indicate the slider positions for forward, neutral, and reverse.

Circulation of the operating fluid, which conveniently may be an oil, to and from the working space under pressure is obtained by a primary pump (not shown) driven from engine shaft 1 through the gear 1a (Figure 1), the pump delivery being to passage 152 and passage 156 (see Figure 6) to the inner radial working space zone, with the outflow through passage 67b in the outer wall of the housing 100. Maintenance of the torque converter working space under a positive pressure head avoids cavitation and oil frothing.

The clutch arrangement shown in Figure 1 is unique and highly advantageous from the standpoint of performance, assembly and cost of manufacture. By bolting the cover plate 8 to the flywheel 9 and bolting the cover plate 18 to cover plate 8, the unit with its single piston 25 may be easily and inexpensively manufactured and assembled. Only three seal rings are needed in this design, further contributing to simplicity and low cost of manufacture. A further problem is solved by this design, namely, the elimination of undesirable pressure built up due to centrifugal force of the operating pressure fluid within the piston cylinder. In previous designs, it has been necessary to use dump valves, which are both troublesome in operation and expensive in manufacture to release the pressure due to rotation. This centrifugal pressure increase due to rotation may be far greater than the actual working pressure used to energize the clutch piston. For example, with a speed of rotation of approximately 2000 revolutions per minute the centrifugal pressure build-up may amount to 100 pounds per square inch, whereas the working pressure required for energizing the clutch piston may be only fifty pounds per square inch. In the present design, the fluid chambers at opposite sides of the piston 25 are of equal area so that the centrifugal pressure build-up effect in each of the chambers counteracts and neutralizes the centrifugal pressure build-up effect in the companion chamber. With the centrifugal pressure build-up in each chamber balanced on both sides of the piston, the working fluid pressure, for example 50 pounds per square inch, is able to control clutch engagement. Hence, the need for powerful release springs and dump valves as employed in other oil clutches is obviated.

Details of the control valve structure and sleeve arrangement for directing fluid pressure to chambers 26 and 27 of Figure 1 are shown in Figures 2 through 5.

The valve bore is provided with a pressure supply port 125 fed by high pressure fluid, a port 126 communicating with a passage 127 leading to passage 32 of Figure 2 intermediate the sleeves 30 and 31, a port 128 communicating with passage 129 leading to passage 37 between the sleeve 31 and sleeve 36, and fluid pressure exhaust ports 130 and 131, by which pressure fluid may be exhausted to the transmission sump. A cylindrical extension 132 at the right of Figure 3 supports a spring 133 therein, while a cylindrical extension 134 at the left of Figure 3 is threaded for a governor controlled fluid pressure connection and is fitted with a piston 135 therein. A valve body is slidably positioned in the valve bore, the valve body including three lands 136, 137 and 138 joined by reduced stem sections. An extension 139 protrudes into chamber 140 to contact piston 135. An oppositely extended stem section 141 protrudes through spring 133 and outwardly beyond the cylindrical casing 132. A U-shaped strap 142 has its terminal legs slidably positioned on stem 141 and stem 144 of a solenoid 162 and retained thereon by transverse pins 143.

In Figure 4, the slidable valve is shown biased by spring 133 to admit pressure fluid from supply passage 159 hereinafter more fully referred to, through ports 125 and 126 to passage 127, hence by passage 32 (see Figure 2), port 33 and passage 34 to chamber 26. At the same time, chamber 27 is connected to exhaust through passage 39, port 38, passage 37, passage 129, port 128 and exhaust port 130. With the valve positioned as shown, the pressure plate 10 is moved for drive engagement of the clutch 12 of Figure 1, thereby conditioning the transmission for reduction drive through the torque converter.

In Figure 5 the valve is positioned for direct drive. Pressure fluid from a governor, hereafter explained in detail, acts upon piston 135, forcing the valve body to the right and compressing spring 133 as shown. Fluid pressure from supply port 125 is admitted to port 128 and passages 129 and 37, this pressure acting in chamber 27, causing piston 25 to move the pressure plate 10 for drive engagement of the clutch plate 11 for direct drive. Pressure from chamber 26 is exhausted to sump through exhaust port 131.

In Figure 3, the valve body is illustrated in the neutral position. An electrical control system hereafter more fully explained actuates the solenoid 162 for positioning the control valve in neutral. In the position shown, pressure fluid from feed port 125 is admitted to both ports 126 and 128 and passages 32 and 37, while exhaust ports 130 and 131 are blocked off by lands 136 and 137 of the valve body. With pressure in both chambers 26 and 27 on opposite sides of piston 25, pressure plate 10 is centered between and out of contact with both clutch plates 11 and 12. With both clutches released, no engine torque may be transferred to shaft 14, and the transmission is in neutral.

It will be noted that the valve spring 133 yieldably biases the control valve to apply fluid pressure to chamber 26 for engaging clutch 12 for reduction drive through the torque converter. The solenoid 162 is effective, when energized, to position the control valve to admit fluid pressure to both chambers 26 and 27 for neutral or no-drive condition of transmission operation. The valve actuating piston 135 is responsive to pressure delivered by a governor for positioning the control valve for admitting fluid pressure to chamber 27 for direct drive operation.

An important feature in the construction and arrangement of the clutch control mechanism is the lateral spacing of control chambers 26 and 27 with respect to piston 25. Due to the high rotational speeds at which the clutch drum and piston 25 are rotated, the liquid admitted to control chambers 26 and 27 will tend to remain in said chambers even when the chambers are connected to exhaust. This pressure, arising as a result of centrifugal force may be considerably greater than the actual control pressure utilized. However, by providing the control chambers at opposite sides of the control piston and at an equal radial distance outwardly, the hydraulic force resulting from rotation acts equally on opposite sides of the piston and is balanced.

Figure 6:
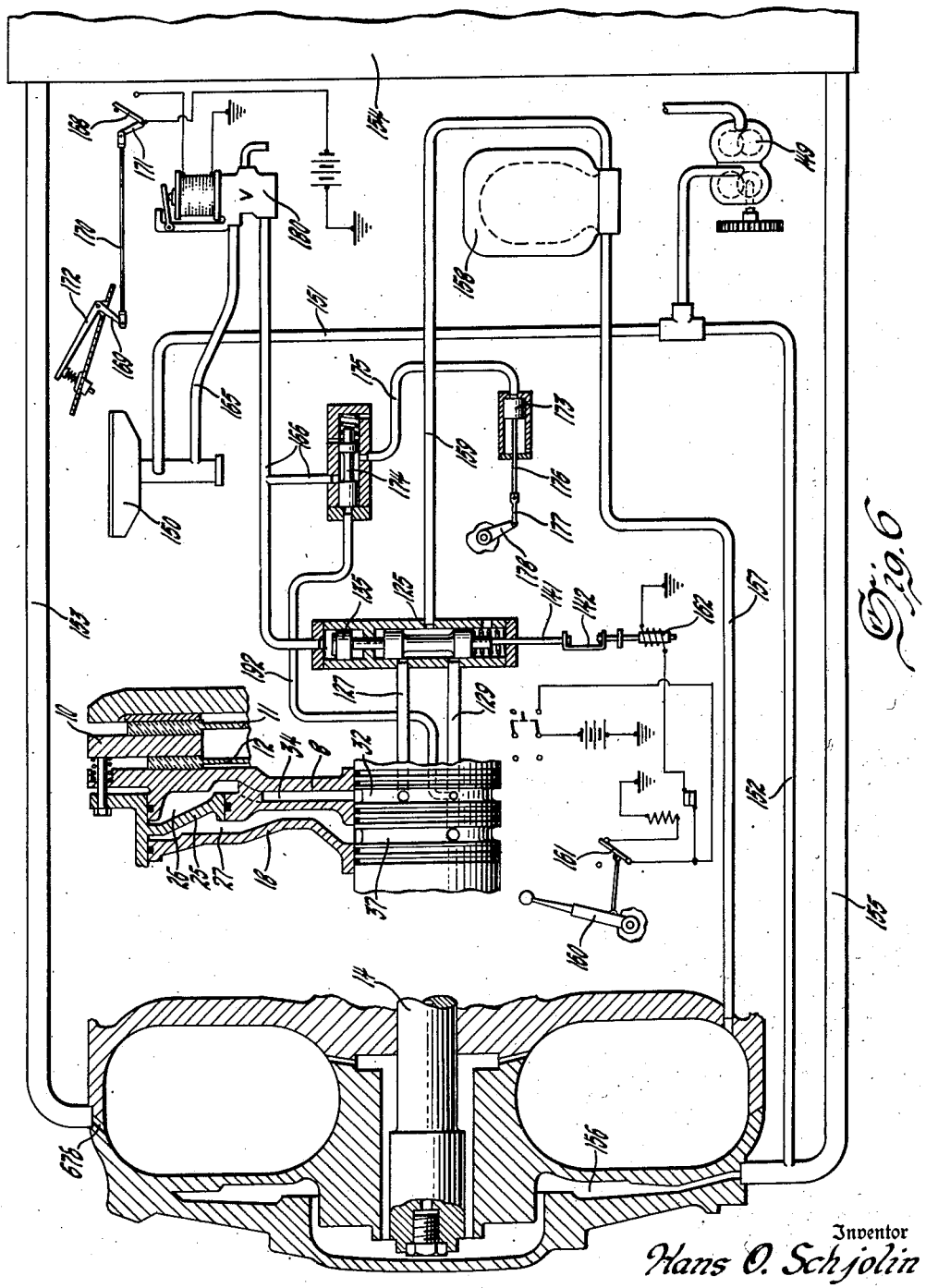
Figure 6 is a schematic diagram of the transmission fluid pressure control system.

Referring to Figure 6, there is shown a schematic diagram of the control system for the transmission. An engine driven pump 149 supplies fluid pressure to a vehicle load shaft driven governor 150 and to the torque converter housing by way of passages 151 and 152. A passage 153 connects the high pressure zone of the torque converter housing to an oil cooler 154, which cooler, in turn, supplies cooled oil back to the torque converter housing by way of passages 155 and 156. A passage 157 connected to the high pressure zone of the torque converter housing feeds pressure fluid to an accumulator 158, the accumulator 158, in turn, supplying fluid pressure to port 125 of the control valve by way of passage 159. A driver-operable control handle 160 may be moved to select forward, reverse, or neutral operation of the transmission. In neutral position illustrated in Figure 6, the control handle 160 closes a switch 161 to energize a solenoid 162, the solenoid being effective when so energized to position the control valve for neutral operation by admitting pressure from port 125 to chambers 26 and 27 to position the pressure plate 10 out of contact with clutch plates 11 and 12.

The speed responsive valve or governor 150 is rotated by the vehicle tail shaft. At speeds below a predetermined vehicle speed, for example 25 miles per hour, centrifugal force is insufficient to shift the valve and it serves to block off passage 151 and to exhaust passages 165 and 166 to sump. At vehicle speeds above the predetermined speed, the governor is effective to deliver full pump pressure from passage 151 to passage 165. A solenoid valve 180 is normally effective to admit pressure from passage 165 to passage 166, but operates to exhaust passage 166 when energized. A switch 168 controlled by linkage 169, 170, 171 from the vehicle accelerator pedal 172, is closed when the accelerator pedal is pressed beyond full open throttle position. Closing of switch 168 energizes the solenoid to open the valve for exhaust of passage 166. Pump pressure from passage 166 acts upon the piston 135 and also as determined by the setting of a valve 174, upon the piston 173. The valve 174 is spring biased to admit pressure from passage 166 to passage 175 leading to one end of piston 173, whose stem 176 is connected to an engine throttle retarding lever 178 by means of link 177.

Figure 7:
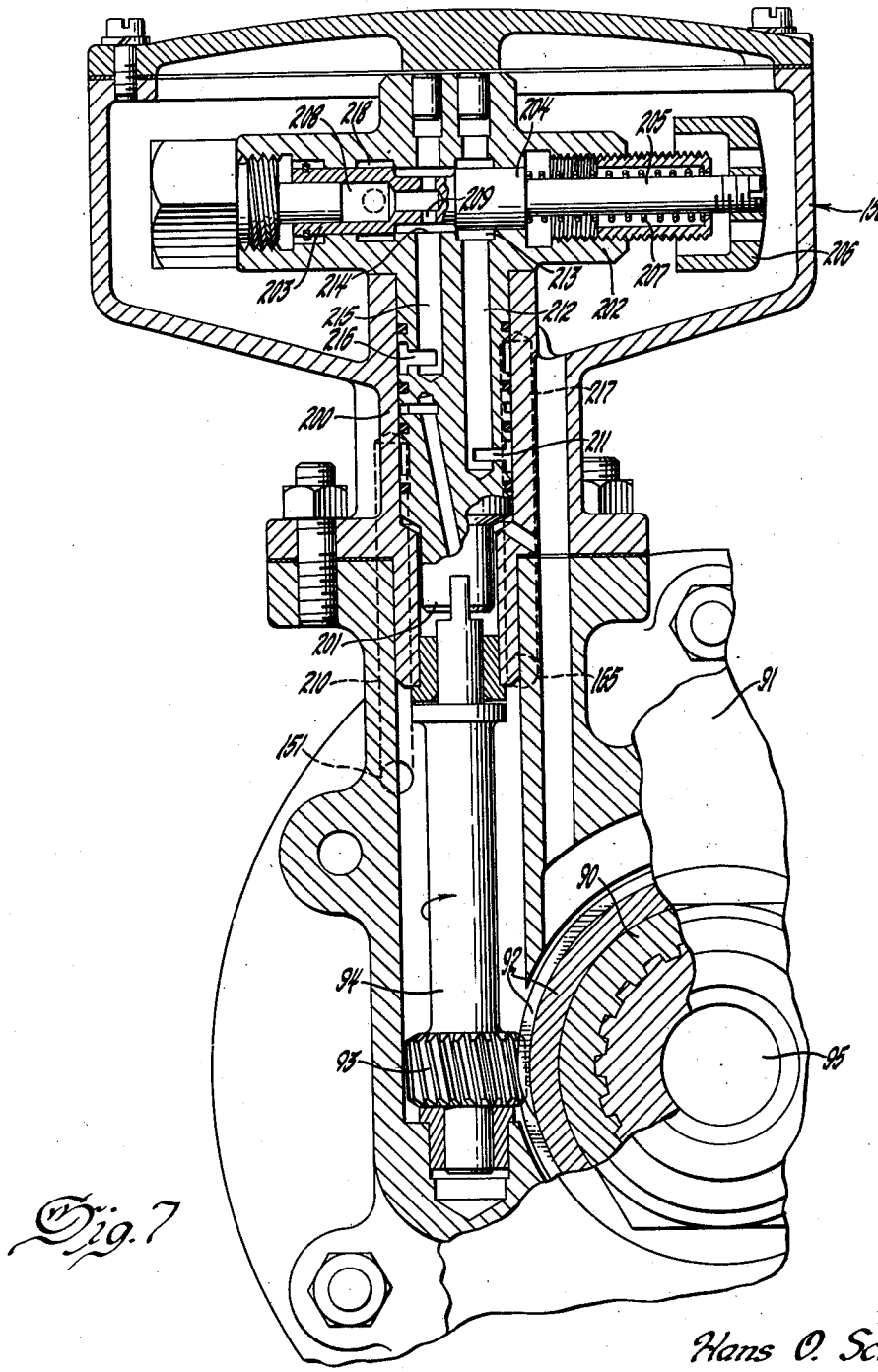
Figure 7 is an enlarged view of the transmission governor, illustrating the porting thereof.
Figure 8:
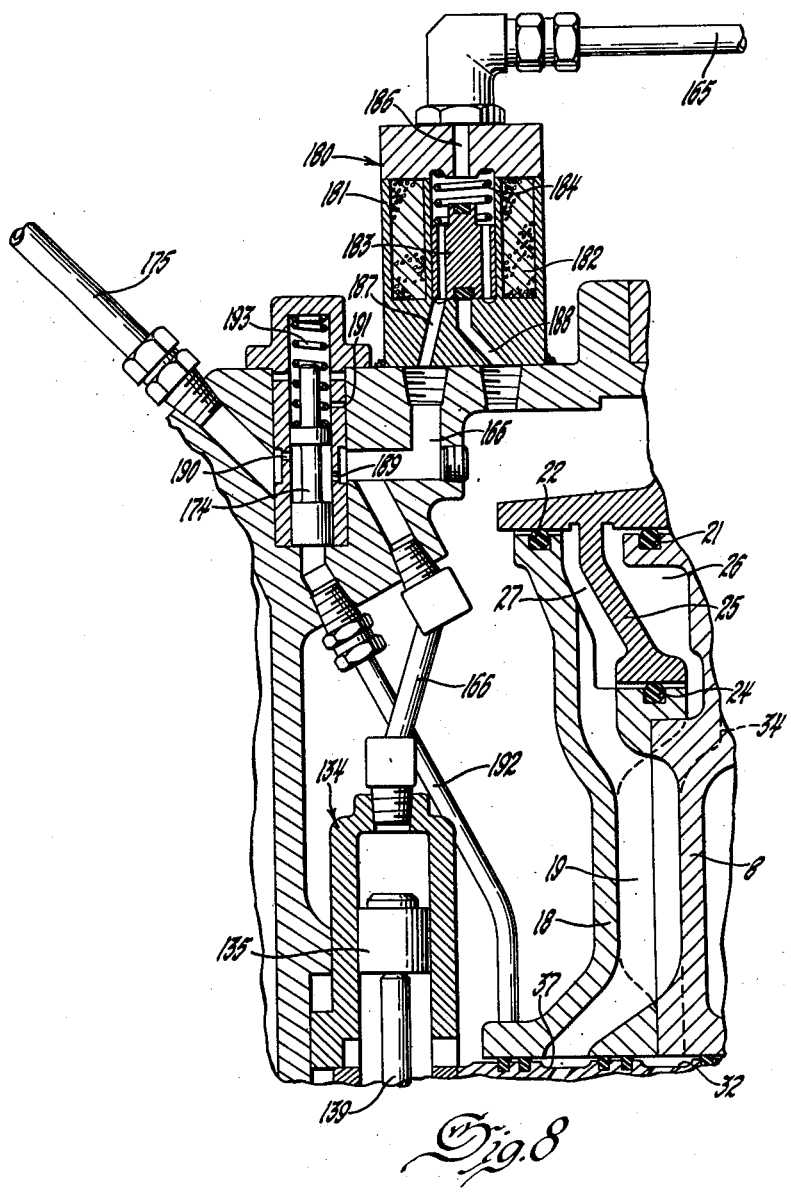
Figure 8 is an enlarged view, of a portion of the control valving of the control system shown in Figure 9.

Details of the various valves are shown in Figures 7 and 8. Referring to Figure 8, the accelerator pedal controlled over-control valve 180 includes a housing 181 enclosing a solenoid coil 182, which, when energized, is effective to raise valve body 183 against the action of spring 184. A passage 186 communicates with passage 187 to admit fluid pressure from governor delivery passage 165 to passage 166. When the vehicle accelerator pedal 172 (see Figure 6) is depressed to open throttle position, switch 168 is closed to energize the solenoid coil, thereby raising valve body 183 and compressing spring 184. With the valve body raised, passages 187, 166 and 175 are connected to exhaust passage 188, to discharge pressure fluid to the sump.

The throttle kick-down control valve 174 has a bore having ports 189, 190, 191, and a spring 193 for yieldably biasing the valve body to its bottom position shown in Figure 8. Pressure in passage 166 is admitted to passage 175 by way of ports 189 and 190. Port 191 exhausts to sump. A passage 192 communicates with passage 129 and admits pressure delivered by the pump to one end of valve 174 so as to close pressure delivery to the conduit 175 and open the same to exhaust. A momentary closing of the fuel throttle occurs when governor pressure starts through the line 175 and simultaneously acts on the piston 135, which causes flow through the conduits 129 and 192, the latter serving to shift the valve 174 and release the throttle.

Details of the vehicle load shaft driven governor are shown in Figure 7. The governor 150 includes a housing 200 for rotatably supporting a stem 201 and valve casing 202. The stem and body portion are rotatably driven by a shaft 94 driven by gear 93 meshing with gear 92 keyed to load shaft 95. The valve casing 202 is provided with a bore adapted to receive a valve body formed of lands 203 and 204 and having a stem 205 extending outwardly from the valve casing to receive a calibrated weight 206 on the end thereof. A spring 207 acts upon one end of land 204, and tends to shut off delivery of pressure fluid by the governor.

The valve body includes a hollow portion forming a chamber 208 which is supplied with delivered governor pressure by way of radial port 209. Fluid pressure from pump supply passage 151 (see Figures 6 and 9) is fed to a passage 210 and by way of annular groove 211 provided in stem 201 to passage 212 terminating at governor input port 213. Land 204 controls the flow of fluid pressure between port 213 and output port 214, the latter port admitting pressure fluid to passage 215, and hence by way of annular groove 216 to passage 217 terminating in governor delivery passage 165.

Weight 206 and spring 207 are calibrated such that land 204 will block off port 213 to prevent governor output at speeds below a predetermined vehicle speed, for example 25 miles per hour. At such vehicle speed, the centrifugal force of weight 206 is sufficient to overcome spring 207 to permit full pump pressure to pass through the governor. When the governor valve opens to deliver fluid pressure, this delivered pressure is admitted to chamber 208 and acts upon the valve body in assistance to weight 206, both the weight and hydraulic pressure in chamber 208 tending to compress spring 207. Thus, while the centrifugal force of weight 206 is alone effective to initially open the governor valve, once the valve is opened, two forces tend to maintain the valve open for delivery of fluid pressure to passage 165. The weight, spring, and area of chamber 208 may be calibrated so that the governor valve will remain closed until the vehicle speed reaches the selected speed of 25 miles per hour. Due to the effect of fluid pressure in chamber 208, the valve will remain open until the vehicle speed drops to a predetermined lower speed, for example, approximately 18 miles per hour. Port 218 is an exhaust port which is opened when spring 207 is effective to move the valve body to the left. This exhausts pressure delivery passage 165 to sump when the governor is not delivering pressure fluid.

*Operation*

The primary control valve as illustrated in Figures 3, 4 and 5, is adapted to be positioned for neutral, torque converter, or direct drive. For neutral, or no-drive, the handle 160 of Figure 6 is positioned to close switch 161, thereby energizing solenoid coil 162 to position the control valve to admit fluid pressure from passage 159 to both passages 127 and 129, this pressure being supplied to control chambers 26 and 27 at opposite sides of piston 25. When fluid pressure is admitted to both chambers 26 and 27, the spring 29 normally biasing the pressure plate to direct drive clutch engagement is held back and the pressure plate 10 is centered out of contact with both clutch plates 11 and 12. No torque may then be transferred through the transmission.

When control handle 160 is positioned for forward operation, switch 161 is opened thereby deenergizing the solenoid 162 and permitting spring 133 to position the control valve for reduction drive through the torque converter. For hydraulic or torque converter drive, spring 133 moves the valve body to admit fluid pressure from passage 159 to control chamber 26, thereby forcing piston 25 to the left in Figure 1 to cause pressure plate 10 to engage clutch plate 12. At the same time, control chamber 27 is connected to sump by way of port 128 and exhaust port 130.

With clutch plate 12 operative to transfer torque from flywheel 7 to the torque converter power input shaft 16, the impeller 60 is rotated to cause circulation of the working liquid in the torque converter. The output turbine member 63 delivers torque to load shaft 14 for setting the vehicle in motion. Initially, governor 150 delivers no fluid pressure, but as soon as vehicle speed reaches the predetermined rate, the governor 150 is effective to deliver full pump pressure to passage 165, this pressure being delivered through valve 180 and by way of passage 166 to the top of piston 135, thereby causing piston 135 to compress spring 133 and to position the main control valve for direct drive. In direct drive, pressure from the supply conduit 159 is admitted by way of ports 125 and 128 to passage 129 and hence by passage 37 to chamber 27. Chamber 26 is connected to exhaust by way of ports 126, 131.

Governor delivered pressure in passage 166 is also directed by way of passage 175 to act upon piston 173 of the throttle kick-down device. Valve 174 is initially spring biased by spring 193 to admit pressure from passage 166 to passage 175 so that when the governor opens to deliver pressure to the piston 135 for moving valve for direct drive, piston 173 is effective to retard the vehicle throttle. Passage 192 communicates with passage 129 and admits fluid pressure against the end of valve 174, causing the valve body to compress spring 193 and to exhaust passage 175 through exhaust port 191 as soon as the fluid pressure is effective to engage the direct drive clutch. Thus, the vehicle throttle is momentarily closed just before the direct drive clutch is engaged. This precludes racing the engine at the moment of shift, provides for smoother clutch engagement and longer useful clutch life.

In the event that the vehicle is being operated in direct drive and the operator requires additional torque, switch 168 may be closed by pressing the accelerator pedal 172 to its lower limit. Closing of switch 168 energizes solenoid 182, thereby raising the valve body 183 to exhaust passage 166 to sump by way of exhaust passage 188. With the exhaust of pressure in the piston cylinder 140, the spring 133 moves the valve body to direct pressure to the control chamber 26 for reduction drive through the torque converter.

The preceding description recites the objects, advantages and useful results of the invention, and there has been embodied therein a number of novel features in combination, which are subject to specific arrangement and forms of structure without departing from the spirit and scope of the invention, as set forth in the appended claims.

I claim:

1. In combination in a transmission having a power input shaft and a power output shaft, clutch means for selectively transferring torque from the input shaft to the output shaft through one of two torque paths, said clutch means including a drum member driven by said power input shaft, a pair of clutch plates, a presser plate disposed intermediate said clutch plates, means carried by the drum forming a chamber, there being a piston in said chamber adapted to be moved to different positions in said chamber, said piston separating said chamber into control chambers at opposite sides of said piston, means connecting said piston to said presser plate for moving said presser plate with respect to said drum in response to movement of said piston in said chamber, a fluid pressure source, and valve means operable to control the admission of fluid pressure to either or both of said control chambers for controlling the position of said piston and presser plate with respect to said drum.

2. In combination in a transmission having a power input drum member, a pair of clutch plates, a presser plate disposed intermediate said clutch plates, means carried by the drum forming a chamber, there being a piston in said chamber movable within said chamber, said piston separating said chamber into control chambers at opposite sides of said piston, means connecting said piston to said presser plate, said piston and said presser plate being laterally movable as a unit with respect to said drum for establishing different combinations of engagement and disengagement of the clutch plates with respect to the drum, a fluid pressure source, and valve means for controlling the admission of pressure fluid from said source to either or both of said control chambers for establishing different positions of the piston.

3. In combination in a transmission having a power input, a drum member, a pair of clutch plates, a presser plate disposed intermediate said clutch plates, means carried by the drum forming a chamber, a piston disposed in said chamber and laterally movable therein, said piston separating said chamber into a pair of control chambers at opposite sides of said piston, means rigidly connecting said piston to said presser plate, said piston and said presser plate being movable laterally with respect to said drum for establishing different combinations of engagement and disengagement of the clutch plates with respect to the drum, a fluid pressure source, valve means effective to control the admission of fluid pressure to either or both of said control chambers to selectively establish different combinations of pressure in the control chambers, and spring means for biasing said presser plate out of contact with said clutch plates when said valve means is effective to establish equal pressures in the two control chambers.

4. A transmission including a power input clutch drum, a pair of clutch plates adapted to transmit power from said drum to a load shaft through different torque paths, a presser plate disposed intermediate said clutch plates, a radially extending web secured to said drum and forming therewith a clutch chamber, means adjacent said web member forming therewith a chamber, an annular piston in said chamber movable with respect to said web, an opening in said means, said piston having a portion thereof extending through said opening, a flange carried by said piston adapted to close said opening irrespective of the position of said piston in said chamber, said piston being effective to divide said chamber into control chambers at opposite sides and said piston, means directly connecting said piston to said presser plate, said piston and said presser plate being laterally movable as a unit with respect to said clutch drum for establishing different combinations of engagement and disengagement of the clutch plates with respect to the drum, a fluid pressure source, and a valve for controlling the admission of fluid pressure to said control chambers for controlling the position of the piston.

5. A transmission including a load shaft, a clutch drum, a pair of clutch plates adapted to transmit torque from said drum to said load shaft through different torque paths, a presser plate disposed intermediate said clutch plates, a radially extending web secured to said drum and forming therewith a clutch chamber, a housing member adjacent said web member forming therewith a space, an annular piston in said space movable with respect to said web, said piston having a portion thereof extending between the web and housing member, a flange member carried by said piston extending from each side of said piston and overlying said web and housing members, sealing means between said piston flange and said web and housing members respectively, said piston being effective to divide said space into a pair of control chambers at opposite sides of said piston, a fluid pressure source, and a valve for controlling the admission of fluid under pressure to said control chambers for controlling the position of the piston.

6. In combination in a transmission, a power shaft, a load shaft, a clutch drum rotatably driven by said power input shaft, a pair of clutch plates adapted to transfer torque to said load shaft through different torque paths, a presser plate disposed intermediate said clutch plates, a piston operatively connected to said presser plate, control chambers at each side of said piston, a fluid pressure source, valve means for controlling the admission of fluid pressure from said source to said chambers, means yieldably biasing said valve means to admit fluid pressure to one of said control chambers for drive through one clutch, speed responsive means for positioning said valve to admit pressure fluid to the other of said control chambers for drive through another of said clutches, and manually controlled means for positioning said valve to admit pressure fluid to both of said control chambers for establishing neutral condition of transmission operation.

7. In combination in a transmission, a power shaft, a load shaft, a clutch drum rotatably driven by said power shaft, a pair of clutches adapted to transfer torque from said power shaft to said load shaft through different torque paths, engaging means movable for alternately engaging said clutches to said clutch drum, a piston operatively connected to said engaging means, a pair of control chambers operatively associated with said piston, a fluid pressure source, valve means for controlling the admission of pressure fluid from said source to said control chambers, means yieldably biasing said valve means to admit pressure fluid to one of said control chambers for drive through one clutch, speed responsive means for positioning said valve to admit pressure fluid to the other of said control chambers for establishing drive through the other of said clutches, manually controlled means for positioning said valve to admit pressure fluid to both of said control chambers for establishing neutral condition of operation of said transmission, and manually controlled means for over-controlling said valve for establishing drive through said one clutch irrespective of the operation of said speed responsive means.

8. In a vehicle transmission having a throttle controlled engine and a control for regulating said throttle, a power shaft, a load shaft, clutch means for establishing drive from said power shaft to said load shaft through one torque path, a second clutch means for establishing drive from said power shaft to said load shaft through a second torque path, clutch actuating means including a piston and a pair of control chambers, a throttle retarding device, a fluid pressure source, valve means for controlling the admission of fluid pressure from said source to said control chambers, spring means yieldably biasing said valve means to admit pressure fluid to one of said control chambers for establishing drive through one of said clutch means, fluid pressure responsive means for positioning said valve means to admit pressure fluid to the other of said control chambers to establish drive through the other of said clutch means, a vehicle speed responsive governor operable upon a predetermined speed of rotation to deliver fluid pressure to said pressure responsive means, a second valve for controlling said throttle retarding device, means yieldably biasing said second valve to admit pressure fluid from said governor to said throttle retarding device, and fluid pressure responsive means for positioning said second valve to exhaust pressure fluid from said throttle retarding device when said first-mentioned valve is positioned to establish drive from said power shaft to said load shaft through said second clutch means.

9. In a vehicle transmission having a throttle controlled engine and a driver operable control for regulating said throttle, a power shaft, a load shaft, a first clutch for providing drive through one torque transfer path, a second clutch for providing direct drive through a second torque transfer path, a presser plate disposed intermediate said clutches, means for actuating said presser plate to establish different conditions of transmission operation comprising a piston rigidly fixed to said presser plate, control chambers at opposite sides of said piston, respectively, a throttle retarding device, a fluid pressure source, a first valve for controlling the admission of fluid pressure to said chambers, spring means yieldably biasing said valve to admit pressure fluid to one of said control chambers for drive through said first clutch, fluid pressure responsive means for positioning said valve to admit fluid pressure to the other of said control chambers for drive through said second clutch, a speed responsive governor operable upon a predetermined speed of rotation to deliver pressure fluid to said fluid pressure responsive means, a second valve for controlling said throttle retarding device, spring means yieldably biasing said second valve to admit pressure fluid from said governor to said throttle retarding device, fluid pressure responsive means hydraulically connected to pressure delivered by said first valve for positioning said second valve to exhaust fluid pressure from said throttle retarding device when said first valve is positioned to establish drive through said second clutch, and a third valve controlled by driver operable control for exhausting fluid pressure from the fluid pressure responsive means associated with said first valve for selecting drive through said second clutch irrespective of the speed of rotation of said governor.

10. In an engine driven vehicle having an accelerator pedal for controlling the engine throttle, a power shaft, a load shaft, a clutch drum driven by said power shaft, first and second clutches, a presser plate operable to selectively engage said clutches for establishing drive through different torque transfer paths, means carried by the clutch drum for rotation therewith forming a chamber, a piston connected to the presser plate and slidable in said chamber and dividing said chamber into control chambers at opposite sides of said piston, a hydraulic pump for supplying hydraulic fluid under pressure, a first control valve for controlling the admission of hydraulic fluid under pressure to said control chambers, a throttle retarding device, a speed responsive governor, a second control valve for controlling the action of said throttle retarding device, spring means yieldably biasing said first control valve to admit hydraulic pressure fluid to one of said control chambers for establishing drive through said first clutch, fluid pressure responsive means for positioning said first control valve to direct fluid pressure to the other of said control chambers for establishing drive through said second clutch, a third valve, a delivery passage connecting said governor to said third valve, a delivery passage connecting said third valve to said first and second valves, respectively, an additional passage connecting said throttle retarding device to said second valve, said governor being effective when rotated at speeds above a predetermined speed to deliver pressure to said third valve, said third valve being normally effective to deliver fluid pressure to said first valve to position said valve to select drive through said second clutch and to deliver pressure to said second valve, means yieldably biasing said second valve to admit pressure from said third valve to said throttle retarding device, fluid pressure responsive means associated with said second valve responsive to pressure delivered to said second clutch for positioning said second valve to connect said throttle retarding device to exhaust, and accelerator pedal controlled means effective in one position of said accelerator pedal to position said third valve to connect said third valve delivery passage to exhaust to establish drive through said first clutch irrespective of the speed of rotation of said governor.

11. In a vehicle transmission a power shaft, a load shaft, a first clutch operable to establish drive from said power shaft to said load shaft through one torque path, a second clutch operable to establish drive from said power shaft to said load shaft through a second torque path, a presser plate operable to selectively engage said clutches for establishing drive therethrough, respectively, a piston for actuating said presser plate, control chambers at opposite sides of said piston, respectively, a fluid pressure source, a valve for controlling the admission of fluid pressure to said control chambers, means yieldably biasing said valve to position said valve to admit fluid pressure to one of said control chambers for establishing drive through said first clutch, a speed responsive governor effective upon rotation above a minimum speed of rotation to deliver pressure fluid to said valve, pressure responsive means responsive to governor delivered pressure to position said valve to direct fluid pressure to the other of said control chambers for establishing drive through the other of said clutches, electrically controlled means operable to position said valve to direct fluid pressure to both of said control chambers for establishing neutral condition of transmission operation, and a driver operable switch for controlling said electrically controlled means.

12. In a vehicle transmission, a power shaft, a load shaft, a first clutch for establishing drive through one torque path, a second clutch for establishing drive through a second torque path, a presser plate operable to selectively engage said clutches for establishing drive therethrough, respectively, a slidable piston for actuating said presser plate, control chambers at opposite sides of said piston, respectively, a fluid pressure source, a first valve for controlling the admission of fluid pressure to said control chambers, means yieldably biasing said valve to admit fluid pressure to one of said control chambers for establishing drive through said first clutch, fluid pressure responsive means for positioning said valve to admit fluid pressure to the other of said control chambers for establishing drive through said second clutch, a vehicle speed responsive governor, a solenoid valve, a passage connecting said governor to said solenoid valve, a passage connecting said solenoid valve to the fluid pressure responsive means associated with said first valve, said governor being effective when rotated at a speed in excess of a predetermined speed to deliver pressure to said solenoid valve, means normally biasing said solenoid valve to admit fluid pressure from said governor to said first valve, and an accelerator pedal actuated switch effective in one position thereof to control said solenoid valve to connect the fluid pressure responsive means associated with said first valve to exhaust irrespective of the speed of rotation of said governor.

13. In a vehicle transmission, a power shaft, a load shaft, a first clutch for establishing drive through one torque path, a second clutch for establishing drive through a second torque path, a presser plate disposed between said clutches for establishing drive therethrough, respectively, a piston for actuating said presser plate, control chambers at opposite sides of said piston, respectively, a fluid pressure source, a first solenoid valve for controlling the admission of fluid pressure to said control chambers, means yieldably biasing said valve to admit fluid pressure to one of said control chambers for establishing drive through said first clutch, fluid pressure responsive means for positioning said valve to admit fluid pressure to the other of said control chambers for establishing drive through said second clutch, a manually controlled switch effective in one position thereof to energize said solenoid for positioning said valve to direct fluid pressure to both of said control chambers for establishing neutral condition of operation, a vehicle speed responsive governor, a second solenoid valve, a passage connecting said governor to said second solenoid valve, a passage connecting said second solenoid valve to the fluid pressure responsive means associated with said first solenoid valve, said governor being effective upon rotation at a speed in excess of a predetermined speed to deliver pressure to said second solenoid valve, means normally biasing said second solenoid valve to admit fluid pressure from said governor to the fluid pressure responsive means associated with said first solenoid valve, and an accelerator pedal controlled switch effective in one position thereof to energize said second solenoid valve to position said second solenoid valve to connect the fluid pressure responsive means associated with said first solenoid valve to exhaust irrespective of the speed of rotation of said governor.

14. In a vehicle transmission, a power shaft, a load shaft, a first clutch for establishing drive through one torque path, a second clutch for establishing drive through a second torque path, a presser plate disposed between said clutches for establishing drive therethrough, respectively, a piston for actuating said presser plate, control chambers at opposite sides of said piston, respectively, a fluid pressure source, a first valve for controlling the admission of fluid pressure to said control chambers, means yieldably biasing said valve to admit fluid pressure to one of said control chambers for establishing drive through said first clutch, fluid pressure responsive means for positioning said first valve to admit fluid pressure to the other of said control chambers for establishing drive through said second clutch, a solenoid associated with said valve, a switch for energizing said solenoid, said solenoid being effective to position said valve to direct pressure fluid to both of said control chambers to establish neutral, a speed responsive governor, a throttle retarding device, a valve for controlling said throttle retarding device, means yieldably biasing said valve to admit fluid pressure to said throttle retarding device, means responsive to the pressure delivered to said other control chamber for positioning said valve to connect said throttle retarding device to exhaust, a speed responsive governor, a third valve, means yieldably biasing said third valve to hydraulically connect said valve for controlling said throttle retarding device and said fluid pressure responsive means associated with said first valve to said governor, said governor being effective at rotational speeds above a predetermined minimum speed to deliver fluid pressure to said third valve, a solenoid for positioning said third valve to connect said throttle retarding device and the fluid pressure responsive means associated with said first valve to exhaust, and an accelerator pedal controlled switch effective in one position to energize said solenoid.

15. The combination in a transmission of a power input member carrying a pressure chamber, a pair of clutch plates either of which is adapted to be connected to the input member, a piston slidable within the chamber and forming with the chamber a pair of expansible chamber motors, a presser plate between the clutch plates and connected to the piston, the plate and piston being movable as a unit to establish different combinations of engagement and disengagement of the clutches with respect to the input member, spring means for positioning the presser plate out of contact with the clutch plates, a source of fluid under pressure, and means for selectively directing fluid from the source to either or both of the expansible chamber motors.

16. The combination in a transmission of a power input member carrying a pressure chamber, a pair of clutch plates either of which is adapted to be connected to the input member, a piston slidable within the chamber and forming with the chamber a pair of expansible chamber motors, a presser plate between the clutch plates and connected to the piston, the plate and piston being movable as a unit to establish different combinations of engagement and disengagement of the clutches with respect to the input member, a source of fluid under pressure, and means for selectively directing fluid from the source to either or both of the expansible chamber motors.

17. The combination in a transmission of a power input member housing a pair of spaced discs, a slidable cylinder wall surrounding the discs and forming therewith a pressure chamber, a piston connected to the cylinder wall and dividing the chamber into two expansible chamber motors, a pair of clutch plates either of which is adapted to be connected to the input member, a presser plate between the clutch plates and connected to the piston, the piston and presser plate being movable as a unit to establish different conditions of engagement and disengagement of the clutches with respect to the input member, a source of fluid under pressure and means for selectively directing fluid from the source to the expansible chamber motors for positioning the piston.

18. The combination in a transmission of a power input clutch drum, a disc carried by the drum and forming therewith a clutch chamber, a pair of clutch plates and a presser plate in the clutch chamber, the plate being adapted to engage either or neither plate with the drum, a flange carried by said disc, a second disc spaced from the first disc, a slidable cylinder wall surrounding the second disc and flange and forming with said discs a pressure chamber, a piston connected to the cylinder wall and dividing the pressure chamber into a pair of expansible chamber motors, a presser plate between the clutch plates and connected to the piston, the plate and piston being movable as a unit to establish different combinations of engagement and disengagement of the clutches with respect to the clutch drum, source of fluid under pressure, and means for selectively directing fluid from the source to the expansible chamber motors for positioning the piston.

19. In combination, a power shaft, a load shaft, a clutch drum rotatably driven by said power input shaft, a pair of clutch plates adapted to transfer torque to said load shaft through different torque paths, a presser plate disposed intermediate said clutch plates, a piston operatively connected to said presser plate, control chambers at each side of said piston, a fluid pressure source, valve means for controlling the admission of fluid pressure from said source to said chambers, means yieldably biasing said valve means to admit fluid pressure to one of said control chambers for drive through one clutch, speed responsive means for positioning said valve to admit pressure fluid to the other of said control chambers for drive through another of said clutches, valve means hydraulically connecting said speed responsive means and said first-mentioned valve means in series, manually operable means for controlling said second-mentioned valve means to hydraulically disconnect said first-mentioned valve means from said second-mentioned valve means, and manually controlled means for positioning said first-mentioned valve means to admit pressure fluid to both of said control chambers for establishing neutral condition of transmission operation.

20. In a vehicle transmission having a throttle controlled engine and a control for regulating said throttle, a power shaft, a load shaft, clutch means for establishing drive from said power shaft to said load shaft through one torque path, clutch means for establishing drive from said power shaft to said load shaft through a second torque path, clutch actuating means including a piston and a pair of control chambers, a throttle retarding device, valve means for controlling the admission of fluid pressure from said source to said control chambers, means yieldably biasing said valve means to admit fluid pressure from said source to one of said control chambers for establishing drive through one of said clutch means, fluid pressure responsive means for positioning said valve means to admit pressure fluid to the other of said control chambers to establish drive through the other of said clutch means, a speed responsive governor hydraulically connected in series with said fluid pressure responsive means, fluid pressure responsive mechanism for actuating said throttle retarding mechanism, valve means for controlling said throttle retarding actuating mechanism in series hydraulic connection with said governor, and manually controllable valve means hydraulically connected in series with said first-mentioned fluid pressure responsive means and said throttle retarding device control valve, said manually controllable valve means being effective in one position thereof to hydraulically connect said fluid pressure responsive means and said throttle retarding device control valve to said governor and effective in a second position to connect said fluid pressure responsive means and said throttle retarding device control valve to exhaust.

References Cited in the file of this patent

UNITED STATES PATENTS

| 2,102,635 | Lysholm et al. | Dec. 21, 1937 |
|---|---|---|
| 2,170,538 | Sarver | Aug. 22, 1939 |
| 2,229,055 | Dick | Jan. 21, 1941 |
| 2,291,241 | Lawrence | July 28, 1942 |
| 2,322,479 | Schjolin | June 22, 1943 |
| 2,352,478 | Halford | June 27, 1944 |
| 2,380,677 | Schjolin | July 31, 1945 |
| 2,393,835 | Stevenson | Jan. 29, 1946 |
| 2,399,853 | Chilton | May 7, 1946 |
| 2,416,154 | Chilton | Feb. 18, 1947 |
| 2,435,930 | Schjolin | Feb. 10, 1948 |
| 2,437,430 | Lawrence | Mar. 9, 1948 |
| 2,464,538 | Vanderzee | Mar. 15, 1949 |
| 2,479,532 | Wemp | Aug. 16, 1949 |
| 2,488,540 | Hollingsworth | Nov. 22, 1949 |
| 2,519,080 | Simpson | Aug. 15, 1950 |
| 2,523,783 | Schjolin | Sept. 26, 1950 |
| 2,594,811 | Schjolin | Apr. 29, 1952 |

FOREIGN PATENTS

| 449,077 | Great Britain | June 19, 1936 |
|---|---|---|
| 530,002 | Great Britain | Dec. 3, 1940 |